United States Patent
Mannheim Astete et al.

(10) Patent No.: US 11,572,024 B2
(45) Date of Patent: *Feb. 7, 2023

(54) AUTOMOTIVE LAMINATE WITH SUPERIOR CAMERA WINDOW

(71) Applicant: AGP America S.A., Ciudad de Panama (PA)

(72) Inventors: Mario Arturo Mannheim Astete, Lima (PE); Charles Stephen Voeltzel, Lima (PE); Juan Pablo Suarez, Lima (PE); Philip Denton Gordon, Lima (PE); Andres Fernando Sarmiento Santos, Lima (PE)

(73) Assignee: AGP America S.A., Panama (PA)

( * ) Notice: Subject to any disclaimer, the term of this patent is extended or adjusted under 35 U.S.C. 154(b) by 139 days.

This patent is subject to a terminal disclaimer.

(21) Appl. No.: 17/207,621

(22) Filed: Mar. 20, 2021

(65) Prior Publication Data

US 2021/0221302 A1 Jul. 22, 2021

Related U.S. Application Data

(63) Continuation of application No. 16/499,746, filed as application No. PCT/IB2018/052107 on Mar. 27, 2018, now Pat. No. 10,953,816.

(60) Provisional application No. 62/480,249, filed on Mar. 31, 2017.

(30) Foreign Application Priority Data

Jul. 27, 2017 (CO) .................. NC2017/0007600

(51) Int. Cl.
*B60R 11/04* (2006.01)
*B32B 17/10* (2006.01)

(52) U.S. Cl.
CPC ........ *B60R 11/04* (2013.01); *B32B 17/10036* (2013.01); *B32B 17/10293* (2013.01)

(58) Field of Classification Search
CPC ............... B60R 11/04; B32B 17/10036; B32B 17/10293
See application file for complete search history.

(56) References Cited

U.S. PATENT DOCUMENTS

| | | | | |
|---|---|---|---|---|
| 5,902,536 A | * | 5/1999 | Shumaker, Jr. ........ | B29C 70/763 264/263 |
| 2004/0160688 A1 | * | 8/2004 | Noguchi ............. | B32B 17/1066 359/879 |

\* cited by examiner

*Primary Examiner* — Thai Q Tran
*Assistant Examiner* — Jose M Mesa
(74) *Attorney, Agent, or Firm* — The Morales Law Firm; Joseph L. Morales, Esq.

(57) ABSTRACT

The use of camera based safety systems is growing at a rapid rate in modern automobiles. As the industry moves for full autonomous capability, the number of cameras required is increasing. At the same time, windshields, where many of the cameras are mounted are becoming larger and more complex in shape. This presents problems in the area of camera optics. For one, the camera is looking out through at least two layers of bent glass bonded together by a third layer of plastic. Mismatches in the refractive index can result in a double image. The curvature of the glass turns the window into a lens and, in conjunction with the often low installation angle, can reduce the optical clarity of the camera field of view. The laminate of the invention has a cutout in the area of the camera(s) on the interior glass layer where the cameras are mounted.

14 Claims, 9 Drawing Sheets

AUTOMOTIVE LAMINATE WITH SUPERIOR CAMERA WINDOW

FIELD OF THE INVENTION

The present invention is related to a laminated automotive glazing.

BACKGROUND OF THE INVENTION

The use of cameras based safety systems, requiring a wide field of view and a high level of optical clarity, is growing at a rapid rate. As the industry moves towards full autonomous capability, the number of cameras and resolution is increasing. At the same time, windshields, where many of the cameras are mounted, are becoming larger and more complex in shape.

The main cameras require a high, forward looking field of view and so must typically be mounted on the windshield and in the wiper area. Early initial applications were for night-vision. Today, camera based systems are used to provide a wide array of safety functions including adaptive cruise control, obstacle detection, lane departure warning and support for autonomous operation. Many of these applications require the use of multiple cameras. A clear undistorted field of view, with minimal double imaging and excellent MTF (Modulation Transfer Function, a measure of how well a lens maps an image to a sensor), is especially critical for camera based systems to perform as intended. It is essential for these systems to be able to quickly differentiate between objects, capture text, identify signage, and operate with minimal lighting. Further, as the resolution of the cameras used increases the need for a clear distortion free field of view increases.

Figure 9A:
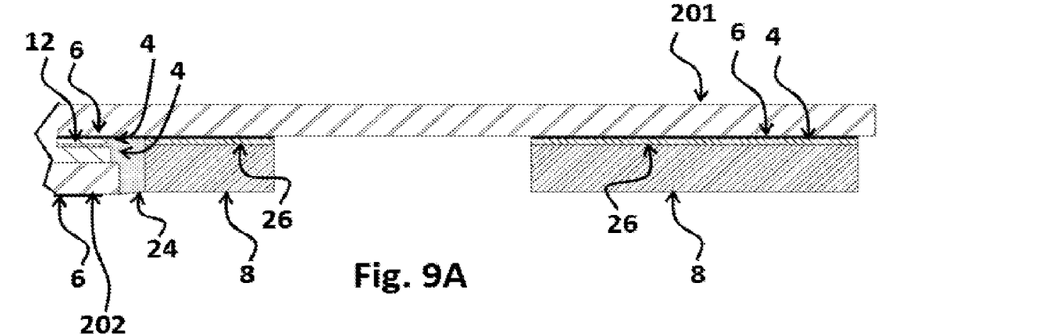
FIG. 9A shows a cross section of a windshield with two cameras according to a seventh embodiment of the present invention.
Figure 9B:
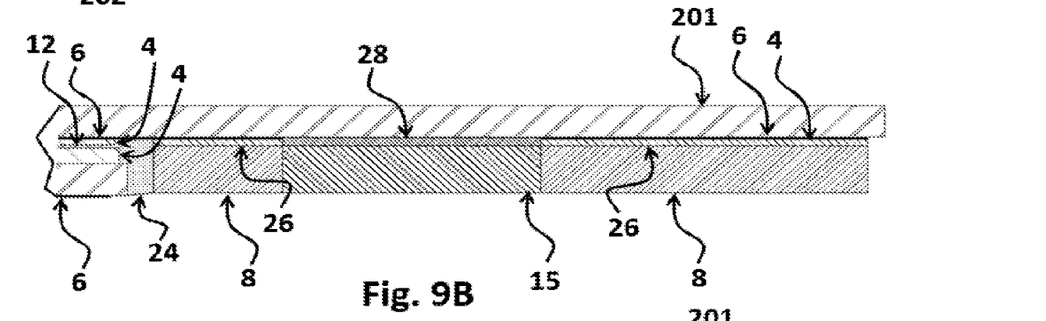
FIG. 9B shows a cross section of a windshield with two cameras according to an eighth embodiment of the present invention.
Figure 9C:
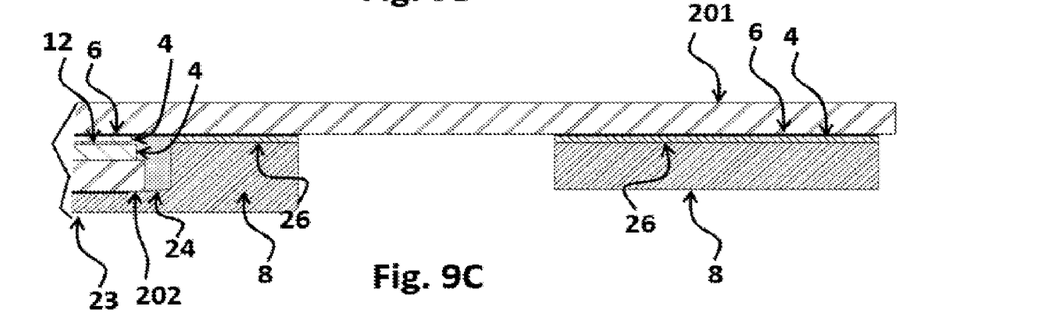
FIG. 9C shows a cross section of a windshield with two cameras according to a ninth embodiment of the present invention.

Laminated windshields are made by bonding two sheets of annealed glass together using a thin sheet of a transparent thermo plastic as shown in FIG. 9. Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. On impact, the plastic layer also helps to prevent penetration by the occupant in the event of a crash and by objects striking the laminate from the exterior.

Figure 1:
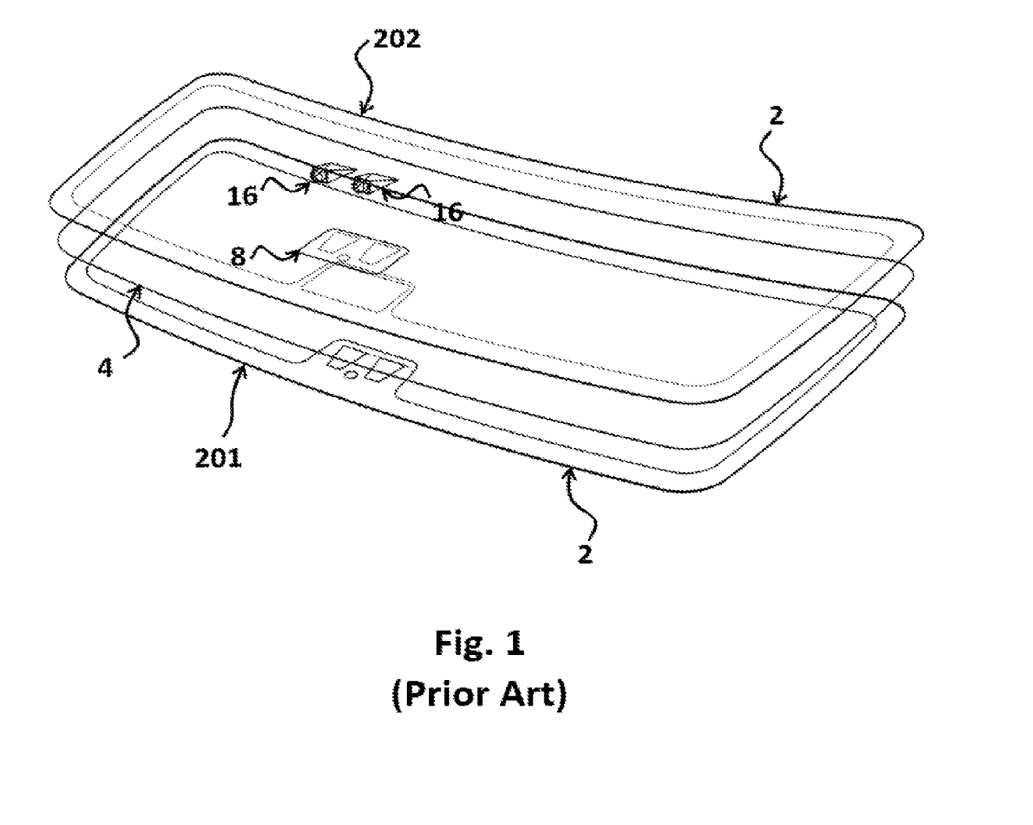
FIG. 1 shows an exploded view of a windshield with two cameras according to prior art.
Figure 2A:
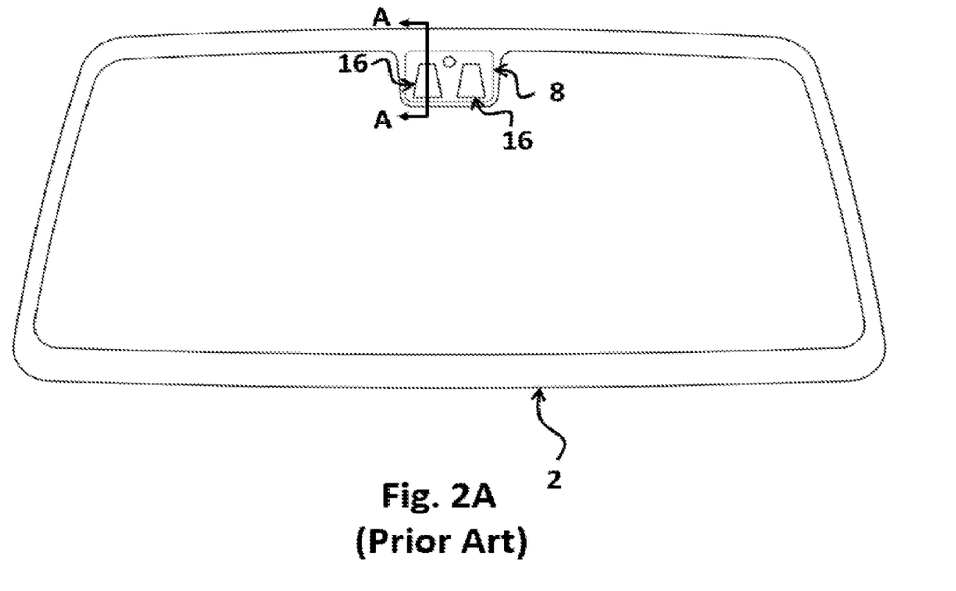
FIG. 2A shows the front view of the windshield of FIG. 1.
Figure 2B:
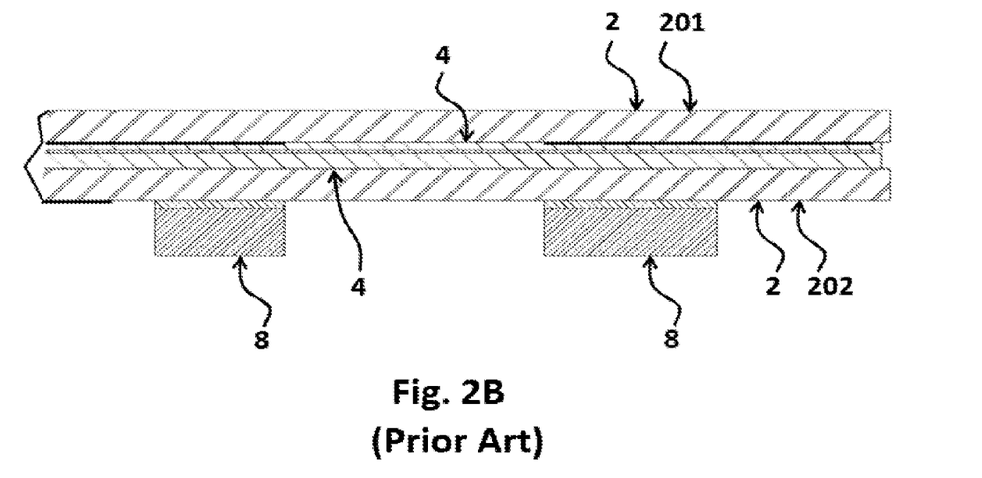
FIG. 2B shows the cross section A-A of FIG. 2A.

This laminated construction presents problems in the area of optics, as shown in FIGS. 1, 2A and 2B. For one, the cameras 16, disposed in a mounting bracket 8, are looking out through at least two layers 2 of bent glass, exterior glass layer 201 and interior glass layer 202, bonded together by a third layer of plastic 4. Secondary reflections from the multiple surfaces can result in double image. The curvature of the glass, in conjunction with the often low installation angle, can also contribute to double image as well as further reducing the optical clarity of the field of view.

It would be desirable overcome these limitations providing a laminated glazing with superior optical quality and performance.

SUMMARY OF THE INVENTION

The invention provides for a laminated glazing with a cutout area in the interior layer of glass for mounting one or more cameras. The cameras are mounted to an insert bonded to the exterior layer or directly to the glass. The area between the edge of the cutout and the cameras can be filled with an adhesive to improve strength. The insert or camera mounting system can be extended such as to overlap the edge of glass to further improve the strength of the laminate. The windshield can also be provided with a lens to correct for any optical aberrations present. The lens can be bonded to the insert or directly to the glass.

Advantages:
Superior optical quality
Corrects for curvature of glass
Eliminates double image
Compensates for installation angle.
Improved safety.
Fabricated using standard automotive glass processes.

BRIEF DESCRIPTION OF THE DRAWINGS

These features and advantages of the present invention will become apparent from the detailed description of the following embodiments in conjunction with the accompanying drawings, wherein.

REFERENCE NUMERALS

2 Glass
4 Plastic bonding layer

6 Black obscuration
8 Mounting bracket
9 Insert
12 Infrared reflecting film
15 Lens
16 Camera
22 Cut out
24 Filler
26 Bracket adhesive
28 Optical adhesive
40 Double image Angle
41 Observation point
42 Incident ray from image
43 Primary image
44 Secondary image
45 Wedge angle
46 Incident angle
50 Normal to surface
52 Angle of deviation
56 Inclination angle
101 Surface one or number one surface
102 Surface two or number two surface
103 Surface three or number three surface
104 Surface four or number four surface
201 Exterior glass layer
202 Interior glass layer

DETAILED DESCRIPTION OF THE INVENTION

Figure 3:
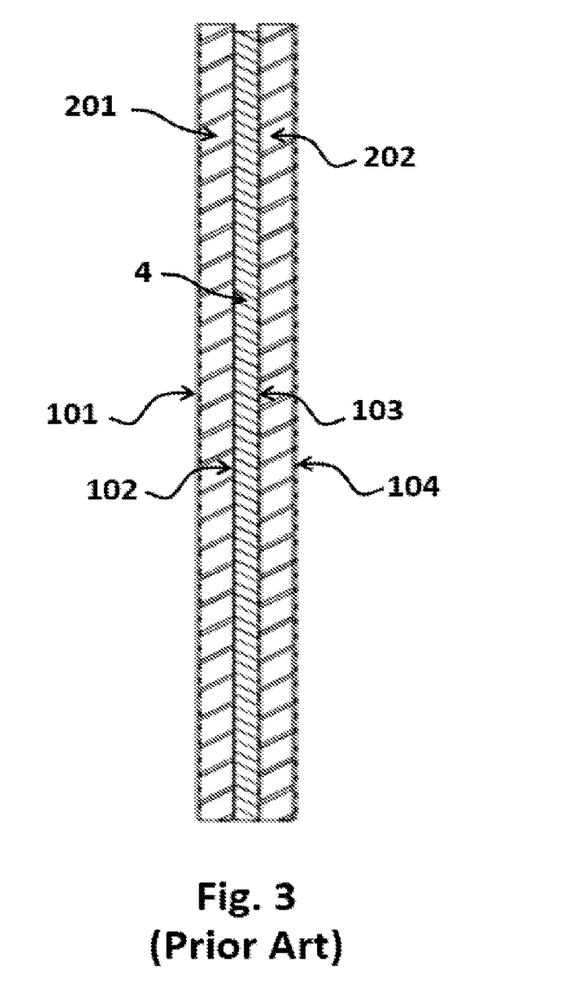
FIG. 3 shows a typical laminated windshield cross section.

In the drawings and discussion, the following terminology is used to describe the configuration of a laminated glazing. A typical automotive laminate, as shown in FIG. 3, is comprised of two layers of glass, the exterior or outer 201 and interior or inner 202 that are permanently bonded together by a plastic layer 4 (interlayer). The glass surface that is on the exterior of the vehicle is referred to as surface one 101 or the number one surface. The opposite face of the exterior glass layer 201 is surface two 102 or the number two surface. The glass surface that is on the interior of the vehicle is referred to as surface four 104 or the number four surface. The opposite face of the interior layer of glass 202 is surface three 103 or the number three surface. Surfaces two 102 and three 103 are bonded together by the plastic layer 4.

The plastic bonding layer 4 has the primary function of bonding the major faces of adjacent layers to each other. The material selected is typically a clear plastic when bonding to another glass layer. For automotive use, the most commonly used plastic layer 4 or interlayer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers are available with enhanced capabilities beyond bonding the glass layers together. The invention may include interlayers designed to dampen sound. Such interlayers are comprised whole or in part of a layer of plastic that is softer and more flexible than that normally used.

The types of glass that may be used in the present invention include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

The glass layers may be comprised of heat absorbing glass compositions as well as infrared reflecting and other types of coatings.

Infrared reflecting coatings include but are not limited to the various metal/dielectric layered coatings applied though magnetron sputtered vacuum deposition (MSVD) as well as others known in the art that are applied via pyrolytic, spray, CVD, dip and other methods.

Figure 4:
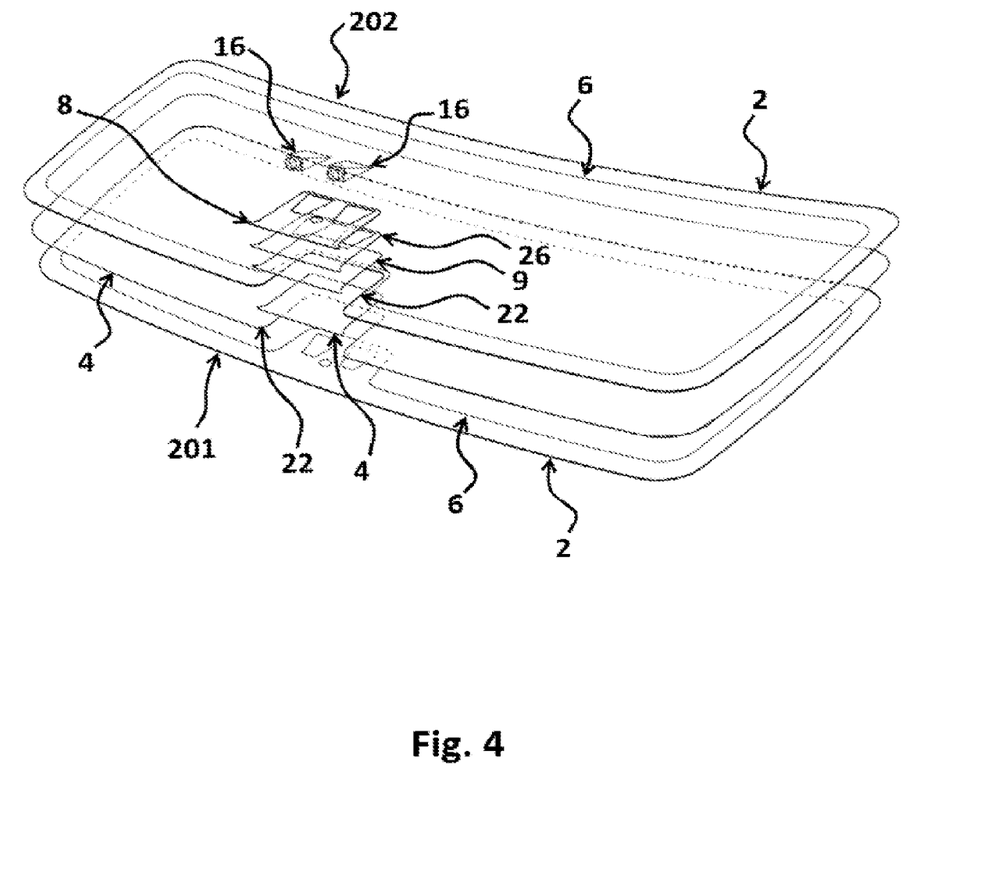
FIG. 4 shows an exploded view of a windshield with two cameras according to an embodiment of the present invention.

Infrared reflecting films 12 (FIGS. 4B, 5B, 7A-7C) include both metallic coated substrates as well as organic based optical films which reflect in the infrared.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment. In the chemical tempering process, ions in and near the outside surface of the glass are exchanged with ions that are larger. This places the outer layer of glass in compression. Compressive strengths of up to 1000 Mpa are possible.

The use of thin glass layers has been found to improve resistance to breakage from impact such as from stone chips. The thinner glass is more flexible and absorbs the energy of the impact by deflecting and then bouncing back rather than breaking as is the case with a thicker stiffer layer of glass. Also, embodiments comprising a borosilicate exterior layer are substantially more resistant to impact than soda lime glass due to the nature of the composition. Embodiments comprising a chemically tempered layer will also exhibit superior resistance to impact as compared to ordinary soda-lime glass due to the high surface compression of such glasses.

Figure 6A:
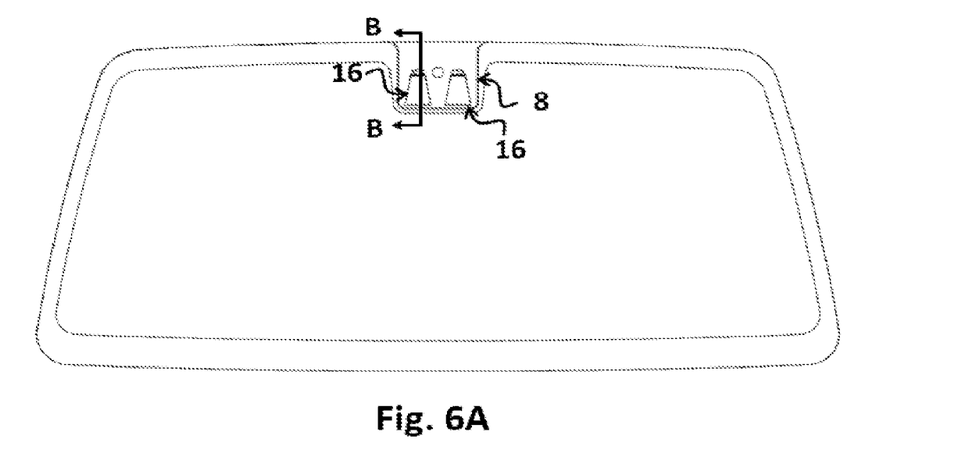
FIG. 6A shows a front view of a windshield with two cameras according to a first embodiment of the present invention.
Figure 6B:
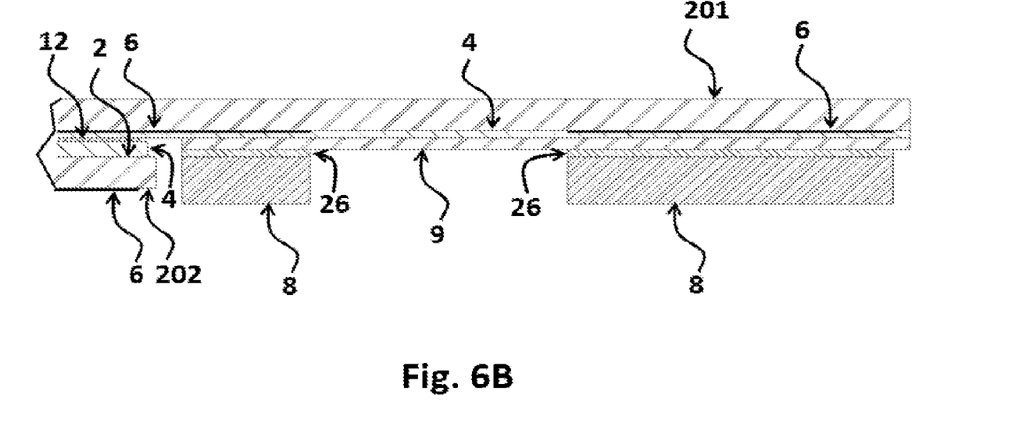
FIG. 6B shows the cross section B-B of FIG. 4A.

The invention, as shown in FIG. 4, is comprised of a laminate having two glass layers 2, exterior 201 and interior 202, with each having opposing major faces bonded together permanently by at least one plastic bonding layer 4 and having at least one cutout 22 in the interior glass layer 202 in the area where at least one camera 16 is mounted. The camera location may be in the top center area of the windshield, the typical location on standard windshields. In this case, the cutout 22 may extend to the edge of glass. Other locations on the windshield may be used. If the location is inboard from the edge of glass, such as on a panoramic windshield (FIGS. 6A and 6B), a hole rather than a notch may be needed.

This can present bending problems due to non-uniform heating and thickness in this area. To solve this problem, a glass plate is made which is of the same composition and thickness as the interior layer 202. This plate is then inserted into the cutout 22 and left there during bending. By doing so, the glass 202 bends the same as it would without the cutout 22. Alternately, the cutout 22 can be made after bending by means of a water jet, laser or other suitable means.

An insert 9 is fabricated to fit into the cutout 22. The insert 9 is designed to align with the camera location when placed into the cutout 22. Sufficient clearance must be allocated to allow for the alignment taking into account the tolerance stack. In some embodiments, there is a 3 mm gap between the insert 9 and the edge of the cutout 22 in the interior glass layer 202.

The insert 9 can be fabricated from any suitable material that can provide the strength needed. Potential materials include but are not limited to: annealed glass, chemically strengthened glass, heat strengthened glass, carbon fiber composite, steel, aluminum, titanium, plastic and fiberglass reinforced plastic all may be suitable depending upon the exact application and loading.

The plastic bonding layer 4 can be used to bond the insert 9 to the surface of the exterior glass layer 201. This is particularly advantageous in that the step can be accomplished by means of the standard automotive autoclave cycle. An autoclave is used to apply heat and pressure to an assembled laminate to complete the lamination process.

The insert 9 may be further reinforced by the addition of additional components such as plates or other formed structures (not shown). The reinforcement may be formed as an integral part of the insert 9. An example would be an injected molded, cast or machined reinforced insert.

The glass layers 2 are formed using gravity bending, press bending, cold bending or any other conventional means known in the art. Gravity and press bending methods for forming glass are well known in the art and will not be discussed in the present disclosure. On parts with minimal curvature a flat sheet of glass can be bent cold to the contour of the part.

Cold bending is a relatively new technology. As the name suggest, the glass is bent, while cold to its final shape, without the use of heat. This is possible because as the thickness of glass decreases, the sheets becomes increasingly more flexible and can be bent without inducing stress levels high enough to significantly increase the long term probability of breakage. Thin sheets of annealed soda-lime glass, in thicknesses of about 1 mm, can be bent to large radii cylindrical shapes (greater than 6 m). When the glass is chemically or heat strengthened the glass is able to endure much higher levels of stress and can be bent along both major axis. The process is primarily used to bend chemically tempered thin glass sheets (<=1 mm) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together it the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, with the exception of having an unbent glass layer added to the stack of glass.

When the insert 9 is fabricated from thin chemically tempered glass, cold bending can be used to form the insert 9.

Figure 5A:
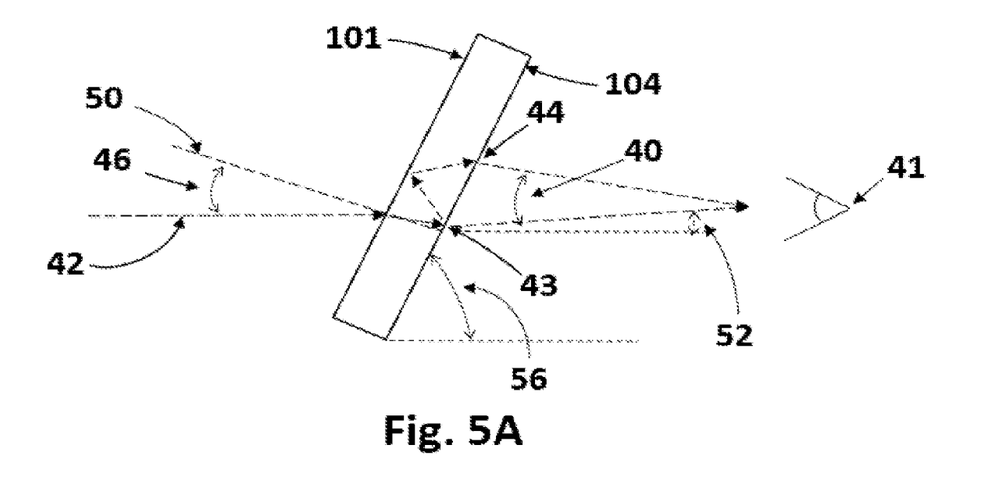
FIG. 5A shows a double image with parallel surfaces.
Figure 5B:
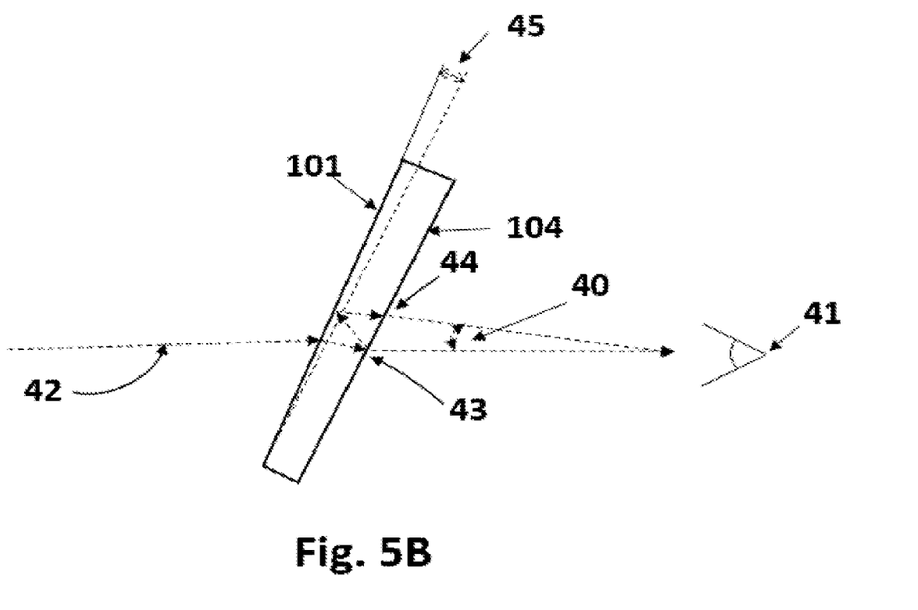
FIG. 5B shows a double image with non-parallel surfaces.

Double image, another problem of the prior art, is illustrated in FIGS. 5A and 5B.

A ray of light 42 enters the surface one 101 of the glass at an incident angle 46 (with respect to the normal 50 to the surface one 101) and passes through the glazing to the observer 41. The light bends (refracts) as it passes through the glazing. The angle by which the light bends is known as the angular deviation 52. This refraction of the light causes a shifting of the apparent position 43 of the object observed.

Some of the light from the ray 42 entering the glass is reflected back from the inside surface four 104 and exits the glazing. A portion of the reflected light is again reflected back from outside surface one 101 resulting in a double image. The separation angle 40 is the angle between the primary 43 and secondary 44 image and the observer 41. If the primary 43 and secondary 44 images are coincident, then the separation angle is zero. Regulatory requirements limit the separation angle 40 to 15 minutes of arc for vision zone A (as defined by United Nations Regulation 42, revision 3) and 25 minutes of arc for vision zone B. However, it is well known that the maximum amount of double imaging imperceptible for the human eye is 7 minutes of arc.

The double image angle, η (separation angle 40), is calculated as shown in equation 1. It increases with decreasing angle of inclination 56, increasing curvature of the glass surface and with increasing size of the glazing. The double image angle, η 40, can be reduced by altering the angle between the layers of glass as shown in FIG. 5B. Normally, the glass surfaces are substantially parallel to each other. By creating an angle 45 between the surfaces, the primary 43 and secondary 44 images can be shifted towards convergence.

$$\eta = \frac{2t\sin(\varepsilon)}{R\sqrt{n^2 - \sin(\varepsilon)^2}} \quad (1)$$

Where:
η: Double image angle
t: thickness of the glazing
n: refractive index
R: radius of curvature The angle 45 (FIG. 5B) between the layers of glass is adjusted through the use of an interlayer that has a non-uniform thickness, typically tapering from a thickness greater than the standard 0.76 mm at or near the top of the glazing a lesser thickness at the bottom. Such interlayers are produced through extrusion of the plastic. Such interlayers are known as "wedge" interlayers. They can also be formed, to a lesser extent by shaping (stretching) of the interlayer. Shaping is typically done to create a curved sunshade.

A shaped or wedge bonding layer can also be used to reduce or eliminate double vision. The bonding layer 4, as shown in FIG. 5B, used to attach the insert 9 to the glass 202 may also have a variable wedge angle.

By reducing the thickness of the laminate in the camera area, double image is improved due to the shortening of the distance that the light travels through the glass and the resulting displacement.

In some embodiments, the area of the insert corresponding to the camera field of view is cutout so that the camera is only covered by a single layer of glass.

A lens may be design to correct for optical aberration and optically bonded to the exterior glass layer surface or to the surface of the insert if used. An optical adhesive is needed which is matched to the index of refraction of the glass. Such adhesives are known in the art and may be of the UV cure or solvent type.

A mounting bracket will generally be required to mount the cameras. The bracket can be mounted directly to the exterior glass surface or to the insert if used. Any suitable adhesive can be used. Some of the adhesive that are in common use for this type of application include two component polyurethane as well as single component moisture curing polyurethanes.

The edge of the bracket may be extended such that it overlaps the edge of the cutout on the interior glass edge. The overlap area may also be bonded to the glass to improve the strength of the laminate.

The insert and the bracket may be further reinforced to provide for additional strength. Common means include but are not limited to: increasing the thickness in at least a portion of the area of the bracket, insert or both, adding additional structural member to the assembly, the use of a stiff interlayer in place of at least a portion of the cutout area.

The gap between the cutout and the camera mounting means can be filled with an adhesive to improve the strength of the laminate. There arc several appropriate adhesives that arc known in the art which include but are not limited to: the two component polyurethane and single component moisture cure polyurethane are good candidates as well as hot-melt and epoxy.

It should also be noted, as one or ordinary skill in the art can appreciate that the invention can be applied to other laminates and positions in addition to the windshield. The windshield is just the most common location to date and the only position which is required by law to be comprised of laminated safety glass.

DETAILED DESCRIPTION OF THE EMBODIMENTS

Figure 7A:
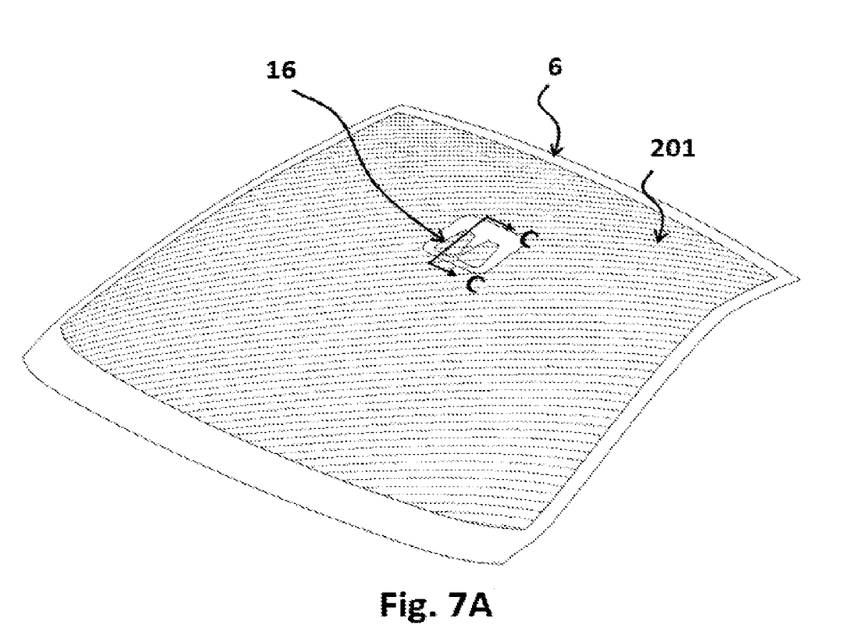
FIG. 7A shows an isometric view of a panoramic windshield with two cameras according to a second embodiment of the present invention.
Figure 7B:
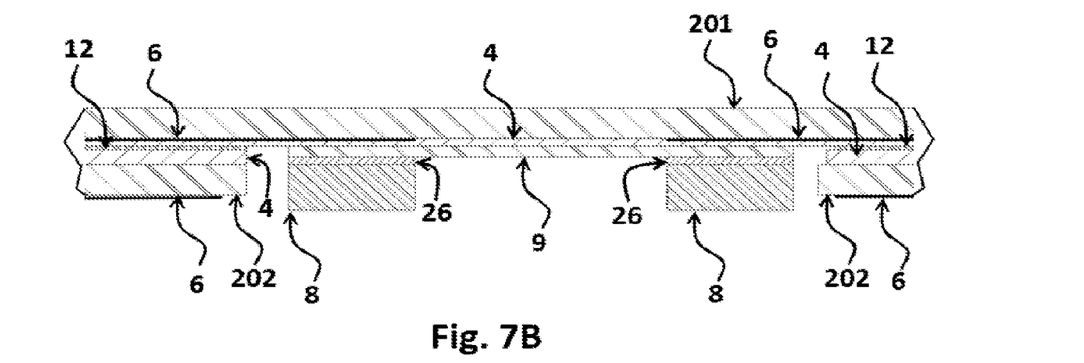
FIG. 7B shows the cross section C-C of FIG. 5A.
Figure 8A:
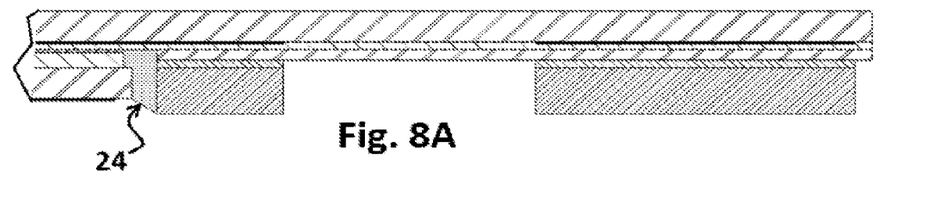
FIG. 8A shows a cross section of a panoramic windshield with two cameras according to a third embodiment of the present invention.
Figure 8B:
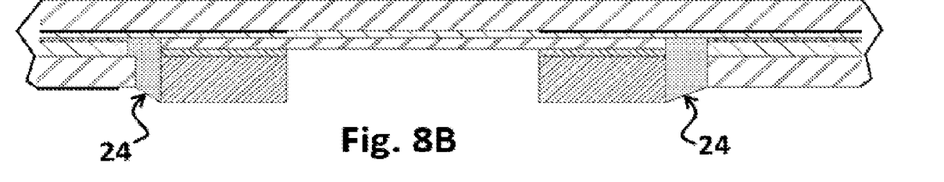
FIG. 8B shows a cross section of a windshield with two cameras according to a fourth embodiment of the present invention.
Figure 8C:
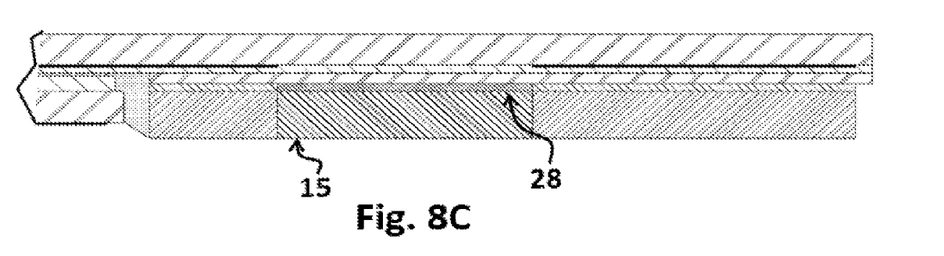
FIG. 8C shows a cross section of a panoramic windshield with two cameras according to a fifth embodiment of the present invention.
Figure 8D:
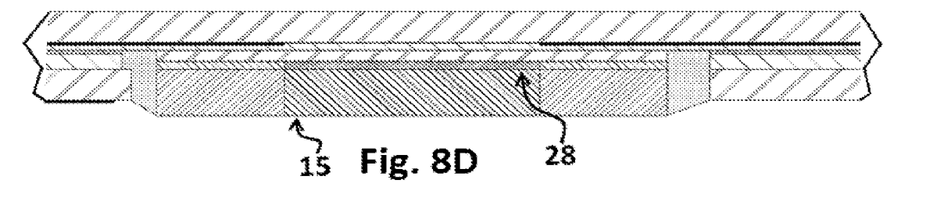
FIG. 8D shows a cross section of a windshield with two cameras according to a sixth embodiment of the present invention.

1. The windshield of FIGS. 6A and 6B, has a standard 2.1 mm exterior glass layer 201. In the camera mounting area, a cutout 22, starting at the edge, in made in both the plastic bonding layers 4 and in the interior layer of glass 202. The notch in the interior glass layer 202 is cut when the flat glass is cut. A separate piece of glass, cut to the shape of the cutout, it also fabricated and then placed in the opening to facilitate the bending process. The windshield has an infrared reflecting film 12 (FIG. 6B) laminated between the two plastic bonding layers 4. The plastic bonding layer 4 adjacent to the exterior glass layer 201, is comprised of 0.38 mm PVB. The other plastic bonding layer 4 is around 0.76 mm PVB. The 0.76 mm PVB layer 4 has variable thickness to compensate for double image. An insert 9, ~3 mm smaller than the cutout 22 is made from 0.7 mm chemically strengthened aluminosilicate glass. The insert 9 is bonded to the exterior glass layer 201 using the 0.38 mm layer of PVB 4 in the autoclave using a standard automotive cycle. The insert 9 is made from flat glass and is cold bent to the contour of the glass. A camera mounting bracket 8 is bonded to the insert 9 by means of a two component poly urethane adhesive 26 after lamination. The cameras 16 are mounted at the assembly factory after installation of the windshield into the vehicle. A black obscuration 6 is printed on both surface two and surface four.
2. The panoramic windshield of FIGS. 7A and 7B, has a standard 2.1 mm exterior glass layer 201. After bending of the glass, in the camera mounting area, a cutout is in made in both of the plastic bonding layers 4 using a CNC blade cutter and in the interior layer of glass 202 using a femto second LASER. The windshield has an infrared reflecting film 12 laminated between the two plastic bonding layers 4. The plastic bonding layer 4 adjacent to the exterior glass layer 201, is comprised of 0.38 mm PVB. The other bonding plastic 4 layer is 0.76 mm PVB. An insert 9, ~3 mm smaller than the cutout is made from 0.7 mm chemically strengthened aluminosilicate glass. The insert 9 is bonding to the exterior glass layer 201 using the 0.38 mm layer of PVB 4 in the autoclave using a standard automotive cycle. The insert 9 is made from flat glass and is cold bent to the contour of the glass. A camera mounting bracket 8 is bonded to the insert 9 by means of a two component poly urethane adhesive 26 after lamination. The cameras are mounted at the assembly factory after installation of the windshield into the vehicle. A black obscuration 6 is printed on both surface two and surface four.
3. The windshield of embodiment 1 is further enhanced by filling the gap between the plastic and glass layers surrounding the mounting bracket with a moisture cure poly urethane filler 24 (FIG. 8A).
4. The windshield of embodiment 2 is further enhanced by filling the gap between the plastic and glass layers surrounding the mounting bracket with a moisture cure poly urethane filler 24 (FIG. 8B).
5. The windshield of embodiment 3 is further enhanced by bonding a lens 15 to the insert 9 using an optical bonding adhesive 28 (FIG. 8C).
6. The windshield of embodiment 4 is further enhanced by bonding a lens 15 to the insert 9 using an optical bonding adhesive 28 (FIG. 8D).
7. The windshield of FIG. 9A (an alternate version of the windshield shown in FIG. 6B) has a standard 2.1 mm exterior glass layer 201. In the camera mounting area, a cutout 22, starting at the edge, in made in both the plastic bonding layers 4 and in the interior layer of glass 202. The notch in the interior glass layer 202 is cut when the flat glass is cut. A separate piece of glass, cut to the shape of the cutout 22, it also fabricated and then placed in the opening to facilitate the bending process. The windshield has an infrared reflecting film 12 laminated between the two plastic bonding layers 4. The plastic bonding layer 4 adjacent to the exterior glass layer 201, is comprised of 0.38 mm PVB. The other plastic bonding layer 4 is 0.76 mm PVB. A camera mounting bracket 8 is bonded to the surface two of the exterior glass layer 201 by means of a two component poly urethane adhesive 26 after lamination. The gap between the plastic and glass layers surrounding the mounting bracket is filled with a moisture cure poly urethane filler 24. A black obscuration 6 is printed on both surface two and surface four
8. The windshield of embodiment 7 is further enhanced by bonding a lens 15 to the surface two, using an optical bonding adhesive 28 (FIG. 9B).
9. The windshield of embodiment 9, as shown in FIG. 9C, with a mounting bracket which overlaps 23 the surface four of the interior glass layer 202 and is bonded to surface four with a two component polyurethane.
10. The windshield of embodiment 1 with an insert 9 made from carbon fiber composite.
11. The windshield of embodiment 1 with an insert 9 which overlaps the surface four of the interior layer of glass and is bonded to surface four with a two component polyurethane.

What is claimed is:

1. A laminated glazing having a camera area comprising:
an exterior glass layer;
an interior glass layer having at least one cutout in the camera area;
at least two plastic bonding layers disposed between glass layers, a first plastic bonding layer adjacent to the exterior glass layer and a second plastic bonding layer adjacent to the interior glass layer; and
an insert bonded to the exterior glass layer in the camera area by means of the first plastic bonding layer;
wherein the second plastic bonding layer has at least a cutout in the camera area.

2. The laminated glazing of claim 1, wherein the insert is of a thickness that is less the thickness of the interior glass layer.

3. The laminated glazing of claim 1, wherein the insert at least partially overlaps the interior glass layer such that the at least one cutout of both interior glass layer and second plastic bonding layer are disposed completely within the area in which the insert is disposed.

4. The laminated glazing of claim 1, wherein said at least two plastic bonding layers are selected from the group consisting of polyvinyl butyl (PVB), ethylene vinyl acetate (EVA), and thermoplastic polyurethane (TPU).

5. The laminated glazing of claim 1, wherein the insert comprises an additional structural member.

6. The laminated glazing of claim 5, wherein the additional structural member is a stiff interlayer.

7. The laminated glazing of claim 1, wherein said insert is substantially comprised of at least one of the following materials: glass, chemically tempered glass, carbon fiber composite, steel, aluminum, titanium, plastic, and fiberglass reinforced plastic.

8. The laminated glazing of claim 1, further comprising a camera mounting bracket.

9. The laminated glazing of claim 8, wherein the camera mounting bracket is bonded to the interior glass layer.

10. The laminated glazing of claim 8, wherein the camera mounting bracket is bonded to the insert.

11. The laminated glazing of claim 8, wherein said camera mounting bracket is substantially comprised of at least one of the following materials: carbon fiber composite, steel, aluminum, titanium, plastic, and fiberglass reinforced plastic.

12. The laminated glazing of claim 8, wherein the camera mounting bracket comprises cutouts in the camera area.

13. The laminated glazing of claim 1, further comprising at least one lens assembly.

14. The laminated glazing of claim 13, wherein said at least one lens is optically bonded to the insert.

* * * * *